No. 701,529. Patented June 3, 1902.
C. R. WYBORNEY.
PEANUT HARVESTER.
(Application filed July 18, 1901.)
(No Model.) 4 Sheets—Sheet 1.
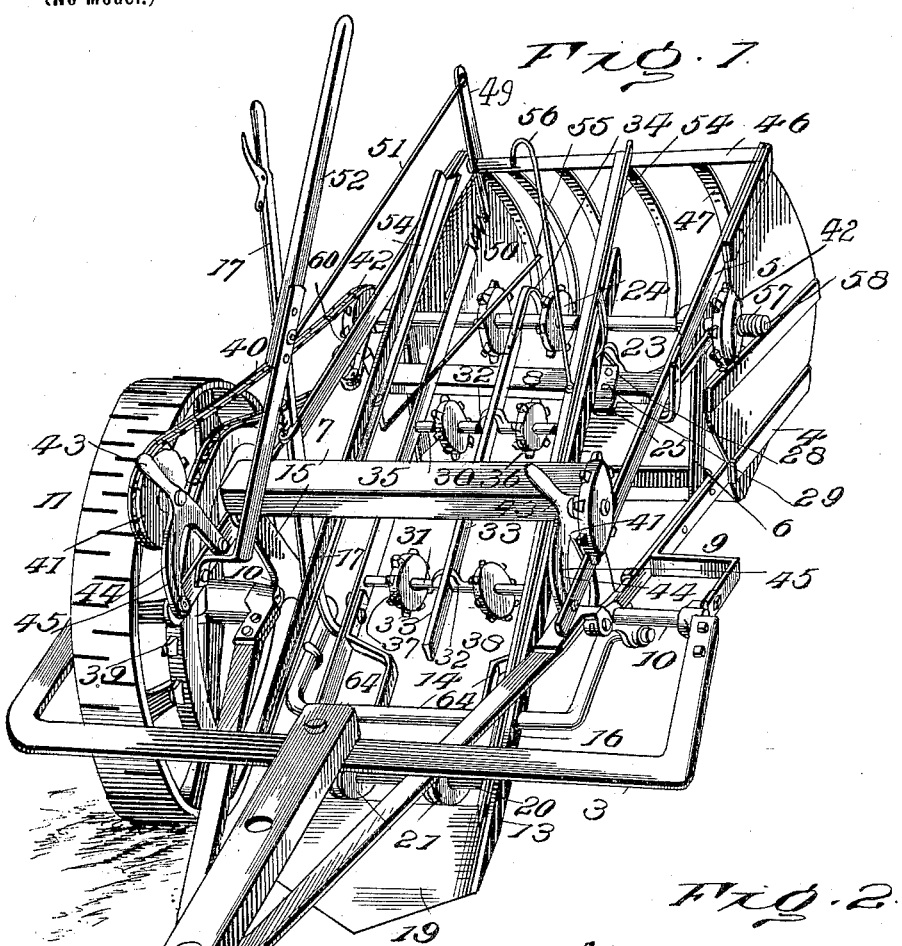

No. 701,529. Patented June 3, 1902.
C. R. WYBORNEY.
PEANUT HARVESTER.
(Application filed July 18, 1901.)
(No Model.) 4 Sheets—Sheet 2.
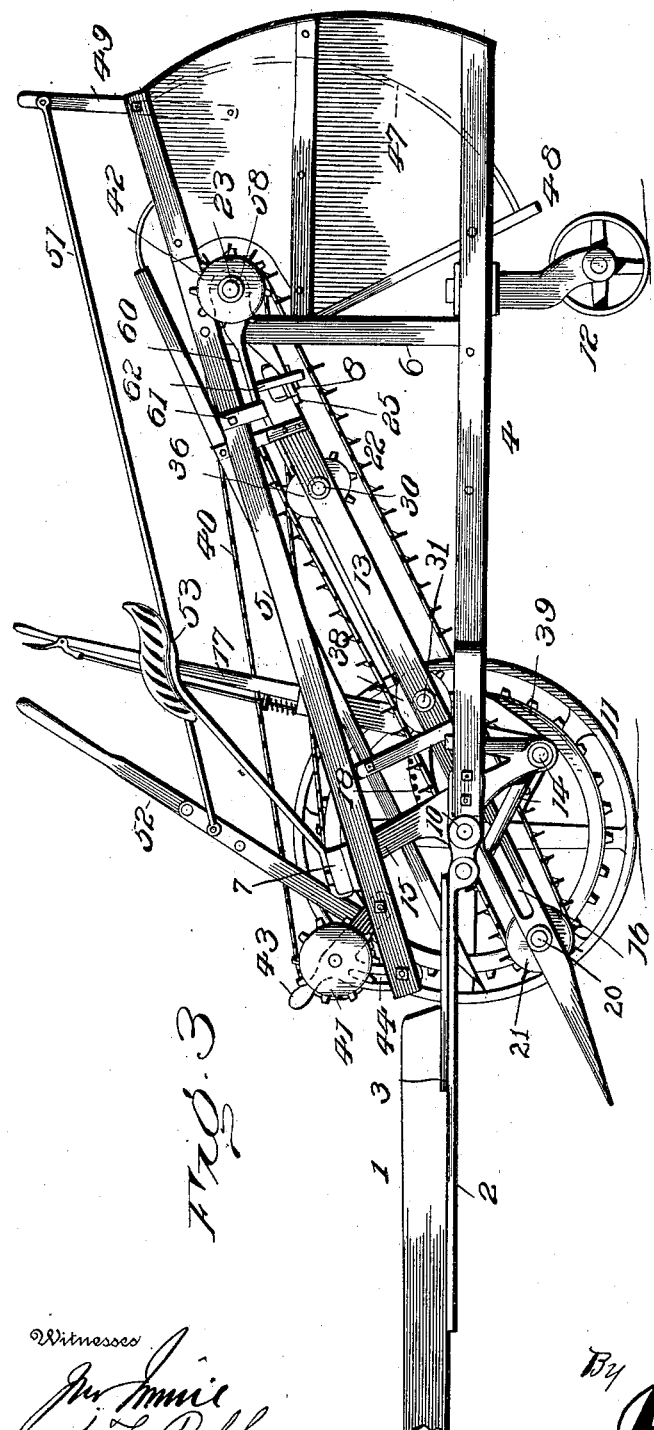
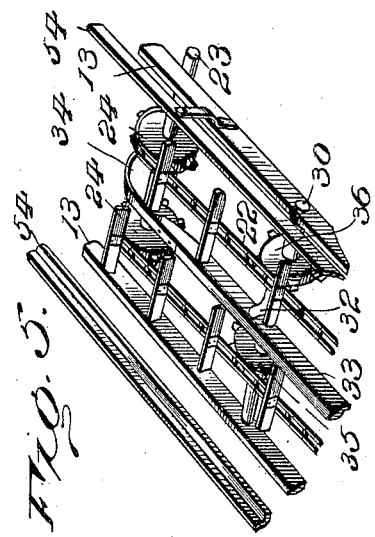
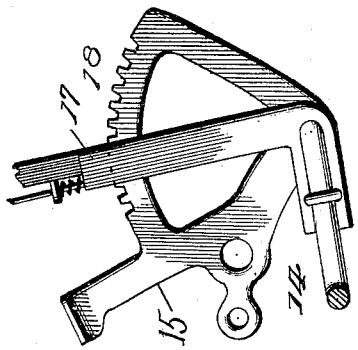
Witnesses
Inventor
C. R. Wyborney
By
Attorneys No. 701,529. Patented June 3, 1902.
C. R. WYBORNEY.
PEANUT HARVESTER.
(Application filed July 18, 1901.)
(No Model.) 4 Sheets—Sheet 3.
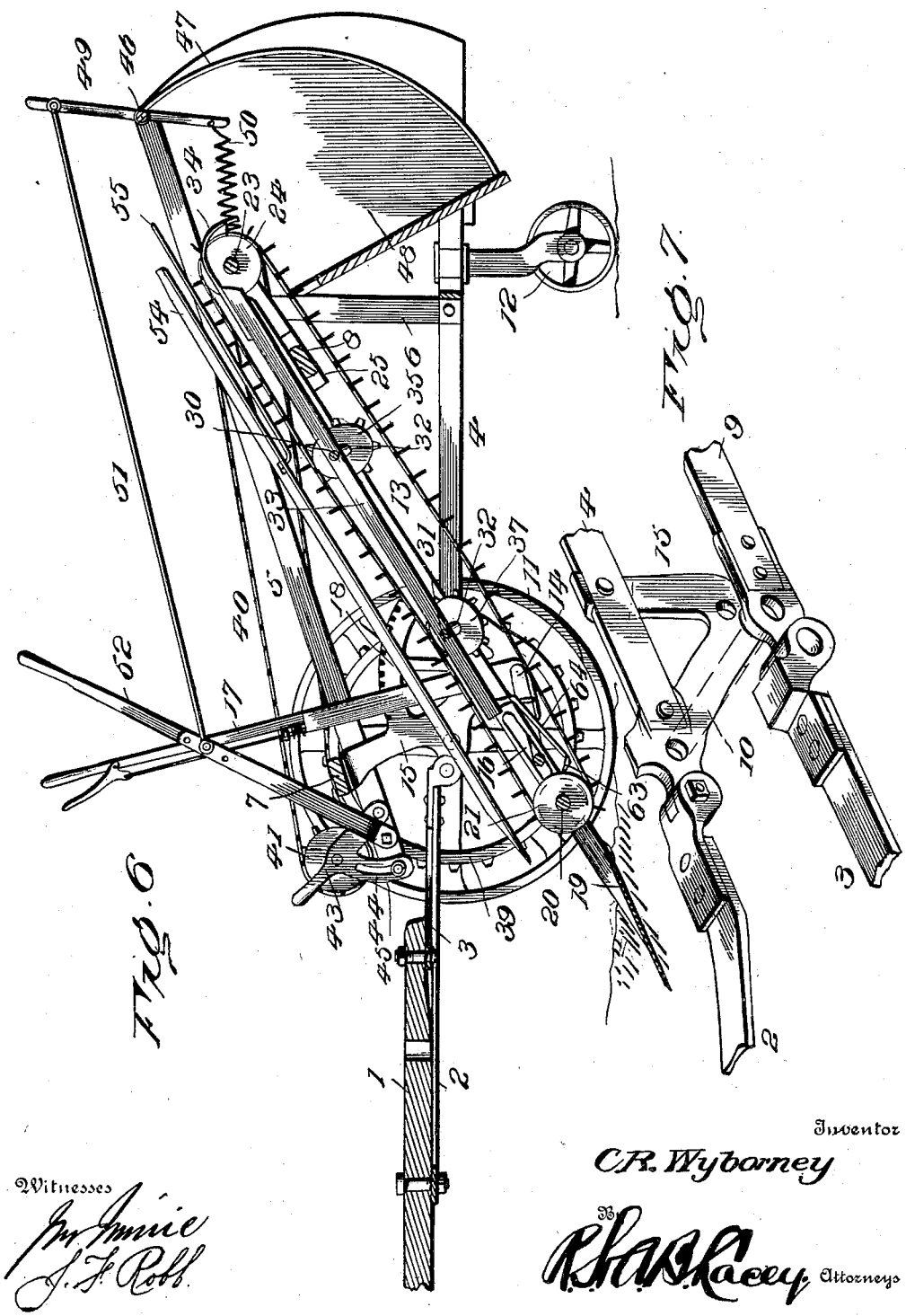

No. 701,529. Patented June 3, 1902.
C. R. WYBORNEY.
PEANUT HARVESTER.
(Application filed July 18, 1901.)
(No Model.) 4 Sheets—Sheet 4.
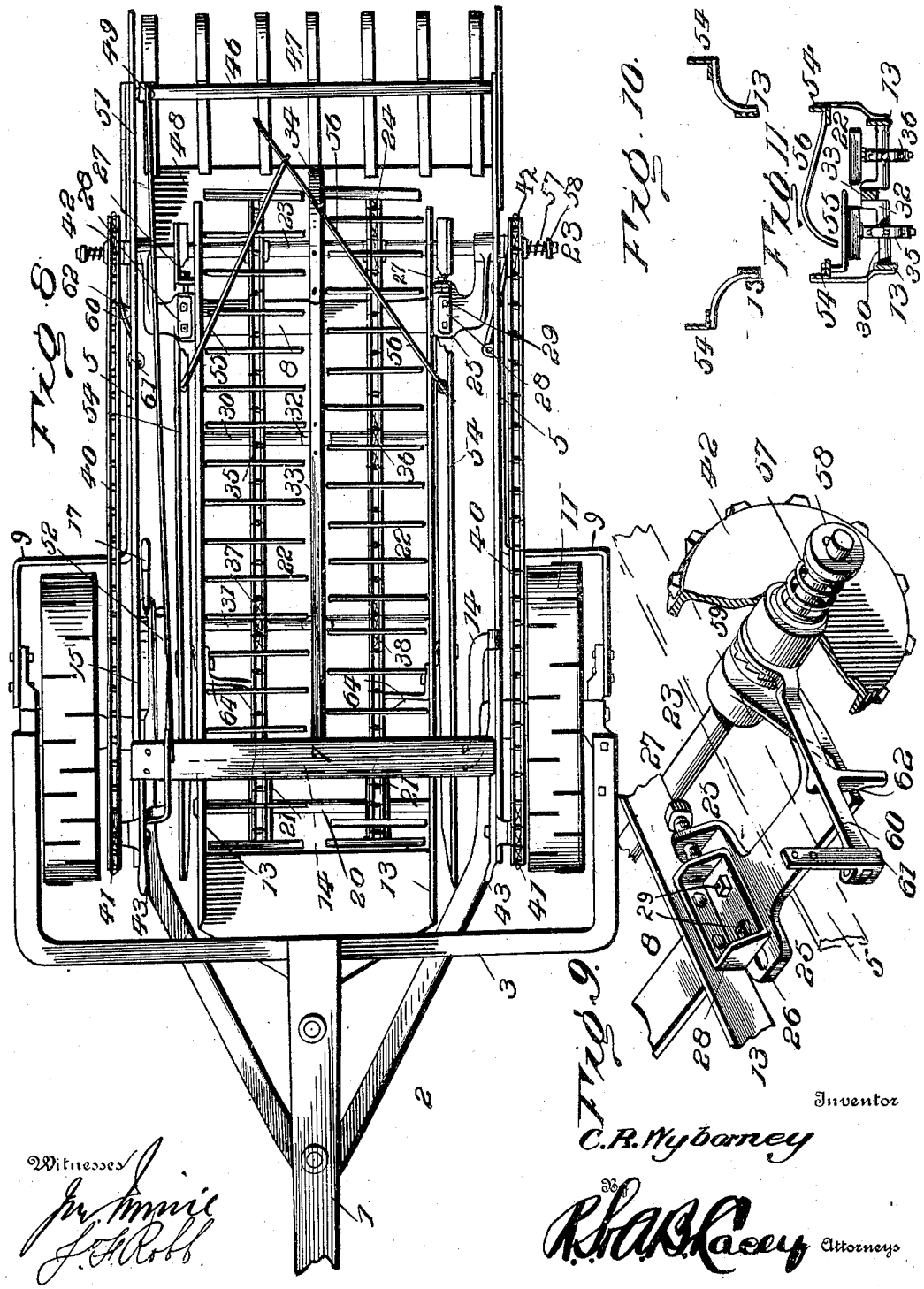
Witnesses
Inventor
C. R. Wyborney
Attorneys

UNITED STATES PATENT OFFICE.

CHARLES R. WYBORNEY, OF PETERSBURG, VIRGINIA.

PEANUT-HARVESTER.

SPECIFICATION forming part of Letters Patent No. 701,529, dated June 3, 1902.

Application filed July 18, 1901. Serial No. 68,824. (No model.)

*To all whom it may concern:*

Be it known that I, CHARLES R. WYBORNEY, a citizen of the United States, residing at Petersburg, in the county of Dinwiddie and State of Virginia, have invented certain new and useful Improvements in Peanut-Harvesters; and I do hereby declare the following to be a full, clear, and exact description of the invention, such as will enable others skilled in the art to which it appertains to make and use the same.

This invention relates to harvesters, and more particularly to the subsoil class which open the ground, lift, and deliver the harvest clear of the machine.

The machine is constructed most especially for groundnuts and is drawn or otherwise propelled over the field and digs the peanuts, removes all soil by a shaking and vibratory motion, and dumps the vines and pindars in heaps, this being controlled by the driver.

The machine comprises a single plow, two endless elevators, means for imparting a vibratory motion to the elevators for agitating the pindars to loosen and remove the soil, a carrier for receiving the vines and nuts, and holding them until a sufficient quantity has accumulated to form a bunch or pile of desired size, which is dropped in a heap by tripping the carrier, an agitator-bar for shaking the nuts as they are moved upward by the carrier, a clutch for throwing the machine into and out of gear when lowering and raising the plow, and novel means for regulating the tension of the drive-belts and elevators.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a peanut-harvester embodying the invention, the elevators and the drive-wheel and drive-chain on the near side being omitted. Fig. 2 is a detail perspective view of the lower portion of the elevator-frame, showing the plow, the lower supports for the elevators, and the crank-shaft by means of which the plow and lower end of the elevator-frame are raised and lowered. Fig. 3 is a side elevation of the machine. Fig. 4 is a detail view of the right-hand casting, having the rack or toothed bar for coöperation with the latch-lever attached to the crank-shaft, so as to hold the latter and the plow in an adjusted position. Fig. 5 is a detail perspective view of the upper rear end portion of the elevator-frame and coöperating parts, showing the side guards. Fig. 6 is a central longitudinal section of the machine. Fig. 7 is a detail perspective view of the means employed for hingedly connecting the main and draft frames. Fig. 8 is a top plan view of the machine. Fig. 9 is a detail perspective view of the clutch-adjusting means between the elevator and main frames and the adjacent parts. Fig. 10 is a detail view of the elevator-frame and side guards, the latter being in the position which they will occupy when the machine is harvesting Virginia peanuts. Fig. 11 is a view similar to Fig. 10, showing the side guards in the position which they will occupy when the machine is harvesting Spanish peanuts, said view also indicating the position of the means for throwing the vines in one direction and the nuts in an opposite direction.

Corresponding and like parts are referred to in the following description and indicated in all the views of the drawings by the same reference characters.

The draft-frame comprises the pole or tongue 1, hounds 2, and a bar 3, having its end portions bent about at a right angle and extended rearward. The main frame comprises longitudinal bars 4, inclined side bars 5, uprights 6, and cross-bars 7 and 8. Side brackets 9, attached to the forward portions of the longitudinal bars 4, are pivotally connected to the bent ends of the bar 3, and the bars 4 have pivotal connection with the rear ends of the hounds 2, the pivotal connections between the several bars being in transverse alinement and coinciding with the axis about which the draft-frame turns. The brackets 9, in effect, constitute a part of the main frame. The manner of pivotally connecting the two frames is unimportant, since the connection may be made in any substantial way found most advantageous. The axles 10 for supporting the ground-wheels 11 are in transverse alinement and are located in the rear of the pivotal connection between the draft and main frames and are supported at their ends in castings or fittings applied to the ends of the bars 4 and brackets 9. This arrangement admits of the draft-frame moving freely without affecting the relation of the ground-wheels to the operating mechanism. The main frame is supported at its front end upon ground-wheels 11 and at its rear end by means of a caster-wheel 12.

The elevator-frame comprises side bars 13, which incline upwardly and rearwardly, being connected and supported at their upper ends by means of the cross-bar 8 and at their lower ends by means of the crank-shaft 14, which is hung in bearings forming a part of the bracket 15, connecting the forward ends of the bars 4 and 5. Longitudinal slots 16 are formed in the bars 13 near their lower ends and receive the horizontal or crank portion of the crank-shaft 14, thereby making provision for the play of the crank-shaft incident to the raising and lowering of the forward end of the elevator-frame. An operating-lever 17 is secured to one end of the crank-shaft 14 and is provided with the usual hand-latch for coöperation with a toothed portion 18 of the right-hand bracket 15 to hold the crank-shaft and lower end of the elevator-frame in an adjusted position. The plow 19 is attached to the lower end of the elevator-frame and is pointed, the edges inclining alike from opposite sides of the point. Any kind of plow best suited for the purpose may be employed, the style illustrated being preferred, as in practice it has been found to operate most successfully.

A shaft 20 is journaled to the bars 13 near their lower ends and is provided with grooved pulleys 21, which support the lower end of the elevators 22, which are of the endless type and comprise sprocket-chains provided at intervals in their length with flights or wings for engagement with the vines and peanuts to carry them upward and rearward for deposition into the carrier. A shaft 23 is journaled in bearings provided at the rear end portion of the machine and attached to the main frame and extends transversely of the machine parallel with the shaft 20 and is provided with sprocket-wheels 24, which support the upper end of the elevators and impart movement thereto. Particular attention is directed to the fact that the elevators are supported at one end by means of the elevator-frame and at the opposite end by means of the main frame. Hence a longitudinal adjustment of the elevator and main frames will loosen or tighten the elevators. As shown most clearly in Fig. 9, the cross-bar 8 has each end portion bent and terminating in a bearing-sleeve, which receives the shaft 23, and this cross-bar near its bent end is widened, as shown at 25, the widened portion extending in the front and in the rear and provided with slots 26. One of the extensions is bent about at a right angle and is pierced to receive a set-screw 27, which is adapted to bear against a bracket 28, secured to a side bar 13 of the elevator-frame. Bolts 29 pass through the bracket 28 and the slots 26 of the widened portion 25 and secure the parts in an adjusted position. When it is necessary to tighten or loosen the elevators, the bolts 29 are loosened and the set-screws 27 turned either forward or backward to effect the desired adjustment of the elevator-frame with reference to the main frame, and after the elevators have been adjusted to the required tension the elevator-frame is secured by retightening the bolts 29.

Transverse shafts 30 and 31 are journaled at their ends to the side bars 13 of the elevator-frame intermediate of their ends and are provided medially with cranks 32, upon which is mounted a bar 33 for shaking and agitating the vines and peanuts as they are carried upward and rearward by the elevators. This shaker or agitator bar 33 is located in the space formed between the two elevators and imparts a vibratory movement to the ground-nuts, which serves to loosen and remove any earth that may cling thereto. The upper end of the bar 33 encircles the shaft 23, as shown at 34, and its purpose is to push the vines from the elevators and cause them to drop into the carrier. The curved end 34 projects beyond the upper end of the elevators, so as to detach the vines therefrom and prevent their following the lower portion of the elevators to the front end of the machine. Elliptical wheels 35, 36, 37, and 38 are secured to the shafts 30 and 31 and are toothed, so as to engage with the upper portion of the respective elevators. These elliptical wheels are intended to impart a vibratory movement to the upper portion of the elevators to assist in loosening and removing any soil that may adhere to the peanuts. The relative arrangement of the elliptical wheels may be such as experiment may demonstrate to give the best results. Practical tests have shown that it is advantageous to arrange the wheels 35 and 36 upon the shaft 30 with the major axis of one about at a right angle to the minor axis of the other. This is true with reference to the arrangement of the wheels 37 and 38 upon the shaft 31. Considering the wheels 35 and 37 and 36 and 38, they are arranged with the major axes of one set at a right angle to the minor axes of the other set.

The elevators are driven from the ground-wheels 11, which constitute drivers, and inasmuch as the driving mechanisms are duplex a detailed description of one only will be given. A toothed rim 39 is formed with or applied to the inner side of a ground-wheel, and the lower portion of a sprocket-belt 40 passes over the upper portion of the said toothed rim, so as to receive motion therefrom. This sprocket-belt 40 is supported at its front end by a sprocket-idler 41 and at its rear end by a sprocket-wheel 42, mounted upon the outer end of the shaft 23, so as to impart motion to the latter and to the elevators by means of the sprocket-wheels 24. The tension of the sprocket-belt 40 may be varied by means of adjustment of the lever 43, to which the sprocket-idler 41 is journaled, said lever having a slotted extension 44, which receives a fastening 45 for securing the lever 43 in an adjusted position. When the fastening 45 is loosened, the lever 43 can be turned upon its pivotal connection with the bar 5 or other portion of the main frame, thereby varying the distance between the centers of the parts 41 and 42. After the belt 40 has been adjusted to the desired tension the lever 43 is made fast by retightening the fastening 45.

The carrier is located at the rear end of the machine and consists of a shaft or cross-bar 46, journaled at its ends to the bars 5, and a series of curved fingers or rods 47, attached to the cross-bar 46 and extended about at a right angle therefrom. An inclined board 48 immediately below the upper or delivery end of the elevators coöperates with the fingers or curved rods 47 to support the vines and pindars until the desired quantity has accumulated, when the carrier is tripped to release the bunch, which will drop in a pile upon the ground in the rear of the machine. A bar 49 is attached intermediate of its ends to an end portion of the shaft or cross-bar 46, and a spring 50 connects one end of the bar 49 to the frame of the machine and is sufficiently strong to hold the carrier closed against a bunch or mass of vines and nuts until its tension is overcome by force applied by the driver. The upper end of the bar 49 is connected by means of a rod 51 with a lever 52 within convenient reach of the driver's seat 53. The ends of the carrier are closed to prevent dropping of the vines between the piles or bunches.

Longitudinal guards 54, supported upon the bars 13, are located at the outer sides of the elevators to prevent lateral displacement or dropping of the vines and nuts, and the lower ends or these guards approach close to the surface of the ground, so as to catch up runners at the outer ends of the vines, so as to insure gathering in of the harvest. Pindars, known commercially as "Virginia peanuts," spread. Hence the guards 54 are located a short distance from the bars 13 of the elevator-frame when the machine is designed for harvesting groundnuts of this variety; but when the machine is designed for harvesting Spanish peanuts, which grow compactly or in bunches, the guards 54 are arranged about in the plane of the side bars 13 of the elevator-frame, as shown most clearly in Fig. 11, Fig. 10 showing the arrangement of the guards 54 when the machine is designed to harvest Virginia peanuts. It is possible and desirable to head the harvest—that is, to throw the vines in one direction and the roots in the opposite direction. This can be readily accomplished with the Spanish peanut, and for this purpose rods 55 and 56 have been devised and arranged substantially as shown in Figs. 1, 8, and 11. The rod 55 is attached to the right-hand side of the machine and extends across the upper portion of the elevator in an inclined direction, and the rod 56 is similarly connected to the left-hand side of the machine and curves upwardly, rearwardly, and toward the right-hand side of the machine and is in a higher plane than the rod 55. The vines are deflected toward the left-hand side of the machine by the rod 55, and the upper portion is thrown over toward the right-hand side of the machine, thereby throwing the roots in one direction and the vines in the opposite direction. The roots being heavier than the vines will always occupy the lowermost position; hence will be engaged by the rod 55, whereas the vines being uppermost will be engaged by the rod 56. Hence the arrangement of the harvest with the vines facing in one direction and the roots or pindars pointing in an opposite direction.

The sprocket-wheels 42 are loosely mounted upon the end portions of the shaft 23 and are provided upon their inner sides with half-clutches to coöperate with corresponding half-clutches secured to the shaft 23, whereby when the two half-clutches are in engagement the sprocket-wheels 42 and shaft 23 will rotate together. A spring 57 is mounted upon each end portion of the shaft 23 and is confined between the sprocket-wheel 42 and a washer 58, held upon the outer end of the shaft by a pin or other means. These springs 57 normally hold the sprocket-wheels 42 in clutched engagement with the shaft 23, the clutch being indicated at 59. A shipper-lever 60 is fulcrumed at its front end to a bracket or part 61 of the main frame and its forked end enters a groove formed in the hub of the sprocket-wheel. A cam-trip 62 is applied to the shipper-lever intermediate of its ends and is located in the path of the end of the cross-bar 8, so as to be engaged thereby. When the plow is lowered so as to enter the ground, the ends of the cross-bar 8 clear the cam-trips 62, and the springs 57 being unrestrained exert an inward pressure upon the sprocket-wheels 42 and hold them in clutched engagement with the shaft 23. When the plow 19 is elevated for any purpose, the ends of the cross-bar 8 come in contact with the cam-trips 62 and force the forked ends of the shipper-levers 60 outward and move the half-clutches of the sprocket-wheels 42 away from the half-clutches secured to the shaft 23, thereby unshipping the clutches 59 and throwing the elevators out of action. The elevator-frame swings upon the shaft 23 as an axis, and the shipper-levers 60 being fulcrumed to the main frame it is obvious that the cam-trips 62 ride upon the cross-bar 8 as the lower end of the elevator-frame is moved up or down. When the plow is lowered, the cross-bar 8 moves downward and permits the shipper-levers to move inward at their upper rear ends under the action of the springs 57 in regaining their normal position.

As the machine is drawn over the field, the plow having been lowered to the proper depth, the peanuts are brought to light and as soon as they clear the plow are taken up by the elevators and carried upward and rearward and dropped into the carrier. In their upward travel the peanuts are shaken and violently agitated in such a manner as to loosen and remove any adhering soil, which drops to the ground through the spaces formed between the flights or wings of the elevators. After a sufficient quantity has accumulated in the carrier to form a bunch or pile of desired size the driver operates the lever 52, thereby releasing the bunch, which drops to the ground immediately in the rear of the machine. When the end of a row is reached or when the plow is elevated for any purpose, the elevators are thrown out of action by the unshipping of the clutches 59 in the manner set forth.

The grooved pulleys 21 are kept clean and prevented from becoming choked by means of scrapers 63, which consist of blades attached to arms 64, attached in any convenient way to the framework of the machine.

Having thus described the invention, what is claimed as new is—

1. In a machine for harvesting peanuts and the like, companion elevators spaced apart transversely, and an agitator-bar located in the space formed between the elevators for imparting a vibratory movement to the article being harvested, substantially as set forth.

2. In a machine for harvesting peanuts and the like, companion elevators transversely spaced, and a shaker-bar arranged in the said space and provided at its upper end with a curved portion projecting beyond the delivery end of the elevators to push the vines and peanuts therefrom, substantially as set forth.

3. In a machine for harvesting peanuts and the like, transversely-spaced elevators, means for imparting a vibratory movement thereto, and a shaker-bar located in the space formed between the elevators, substantially as set forth.

4. In combination, a main frame, an elevator-frame fulcrumed to the main frame and having longitudinal slots, and a crank-shaft journaled to the main frame and having its crank portion operating in the slots of the elevator-frame, substantially as set forth.

5. In combination, a main frame, an elevator-frame longitudinally movable with reference to the main frame, an endless elevator, supports for the said elevator applied to the main and elevator frames, and means for moving the frames longitudinally with reference to each other to effect a tightening or loosening of the elevator, substantially as set forth.

6. In combination, a shaft, an elevator-frame mounted to turn upon said shaft, an endless elevator, supports for the endless elevator mounted upon the aforesaid shaft and elevator-frame, and means for effecting a longitudinal movement of the elevator-frame, the same consisting of corresponding irons, adjusting means for relatively moving the irons, and fastening means for securing the irons in an adjusted position, substantially as set forth.

7. In combination, a shaft, an elevator-frame, a cross-bar having bent ends mounted upon the shaft, said cross-bar having slotted widened portions, one of the widened portions having an end portion bent, brackets secured to the elevator-frame, set-screws mounted in the said bent ends, fastenings for securing the brackets in an adjusted position, an endless elevator, and supports for said elevator applied to the aforementioned shaft and to the elevator-frame, substantially as set forth.

8. In a harvester of the character described, and in combination with the elevator, actuating means therefor including a clutch, and means for raising and lowering the elevator, a shipper-lever, and a trip automatically actuated by the raising and lowering of the elevator to automatically throw the operating mechanism into and out of gear, substantially as set forth.

9. In combination, an elevator, means for raising and lowering the same, an actuating mechanism including a clutch, a shipper-lever in engagement with the clutch and mounted independently of the elevator-frame and having a part to be engaged by a portion of the elevator-frame to effect a making and a breaking of the clutch automatically by a raising and lowering of the elevator, substantially as set forth.

10. In combination, an elevator adapted to be raised and lowered, elevator-actuating mechanism including a clutch, and a shipper-lever for the clutch mounted independently of the elevator and having a cam-trip for cooperation with the elevator to effect an automatic making and breaking of the clutch, substantially as set forth.

In testimony whereof I affix my signature in presence of two witnesses.

CHARLES R. WYBORNEY. [L. S.]

Witnesses:
R. W. DE HAVEN,
M. R. SUTHERLAND.